Sept. 9, 1969  N. BEN-TOVIM  3,466,122
OCULAR REFRACTOMETRY APPARATUS
Filed Sept. 12, 1963  5 Sheets-Sheet 1

INVENTOR
Nathan Ben-Tovim
BY

Sept. 9, 1969  N. BEN-TOVIM  3,466,122

OCULAR REFRACTOMETRY APPARATUS

Filed Sept. 12, 1963  5 Sheets-Sheet 2

INVENTOR.
Nathan Ben-Tovim
BY
Benjamin J. Barish

INVENTOR.
Nathan Ben-Tovim

3,466,122
OCULAR REFRACTOMETRY APPARATUS
Nathan Ben-Tovim, 18 Weisel St.,
Tel Aviv, Israel
Continuation-in-part of application Ser. No. 179,662,
Mar. 14, 1962. This application Sept. 12, 1963, Ser.
No. 308,558
Int. Cl. A61b 3/10
U.S. Cl. 351—6          8 Claims

ABSTRACT OF THE DISCLOSURE

Apparatus for objective ocular refractometry comprises a point-source of light, a transparent mirror reflecting the light into the examined eye and transmitting the light emerging therefrom, a cylindrical lens located behind the mirror so as to collect the rays emerging from the examined eye and mirror, to form them into an astigmatic beam, and to focalize parallel rays into a sharp linear streak of light upon the retina of the examiner's eye, and means for sweeping the rays emerging from the cylindrical lens across the retina of the examiner's eye.

---

The present application is a continuation-in-part of my copending application Ser. No. 179,662 filed Mar. 14, 1962, now abandoned.

The present invention relates to optical apparatus for testing dioptric characteristics of optical devices, such as the human eye, and more particularly to a new instrument for objective ocular refractometry.

Determining refraction by an ophthalmic surgeon is usually carried out in the way that the surgeon uses a small plane mirror with a hole in its middle, by means of which light from an incandescent lamp is reflected into the eye of the patient under examination. By looking through the said mirror the surgeon observes a light and shadow effect in the pupil of the examined eye when the mirror is tilted to and from. The mirror is tilted by the examiner in a manner to sweep different meridians of the eye, and the movement of the light (or the shadow) in the pupil enables him to arrive at certain conclusions concerning the refractive qualities of the eye.

Generally, the eye of the patient and that of the physician are separated by the distance of one meter. In these conditions, if the light in the pupil moves in the same direction as the mirror ("with movement"), the eye is normal ("emmetropic"), or far-sighted ("hypermetropic"), or slightly (less than one diopter) nearsighted ("myopic"). If the light moves in the opposite direction ("against movement"), the eye is myopic (more than one diopter).

This method of examination is called "retinoscopy" or better "skiascopy" ("skia"=shadow) or "the shadow test". This is an objective method for determining the far point of an eye ("punctum remotum," or P.R.), i.e., the conjugate focus of a point of light arising from the retina. For the spot of light formed by the mirror on the patient's fundus forms a new source of light rays which emerge from the pupil to be concentrated at the far point. In emmetropia the emergent rays are parallel; i.e., the far and the P.R. (at which the rays cross) is at a definite distance in front of the eye. In hyperopia the rays are divergent and the P.R. is behind the patient's eye.

It is the object of retinoscopy to find lenses which make the far point correspond to the examiner's eye, i.e., to make the emergent rays cross at one meter. When this occurs no apparent movement of light and shadow exists any more in the patient's pupil. This is called the "neutral point," or the "point of reversal."

The lenses necessary to produce such neutralisation of movement provide an accurate estimation of the refractive error of the examined eye. The dioptric power of the eye is one diopter less than the plus lens, or one diopter more than the minus lens, used to bring about the neutralisation.

But the observation of the play of light and shadow in the pupil and the exact determination of the point of reversal is by no means easy in all circumstances and depends much on the individual abilities and experience of the observer. For these reasons the examinations are not always accurate.

A principal object of the invention is to provide apparatus for ocular refractometry which bring out, more strikingly than the above-described systems, the point of reversal and thus makes the examination more accurate.

A further object is to provide an improved system for determining the axes in astigmatic conditions.

A still further object is to provide apparatus of the foregoing type which permits the eye examinations to be made more quickly and conveniently.

These, as well as additional objects and advantages which will become apparent as the description proceeds, are obtainable by the present invention.

The invention is herein described with particular reference to method and apparatus for ocular refractometry in which a beam of light rays is directed into the pupil of the eye being examined from which it is returned to the examiner's eye. According to a broad aspect of the invention, a point of light is produced upon the retina of the examined eye, and a cylindrical lens is provided to collect rays emerging from the examined eye and to form them into an astigmatic beam. The cylindrical lens is adapted to focus parallel rays into a sharp linear streak of light upon the retina of the examiner's eye, and means are provided to sweep the rays emerging from the cylinder across the retina of the examiner's eye.

The cylindrical lens is preferably a plano-convex one producing but one focal line. However, this is not to preclude the use of a sphero-cylindrical lens producing a pair of focal lines, such as in the well known "Sturm's Conoid." The apparatus further includes optical means for correcting the amethopia of the examined eye.

This arrangement is effective to produce a light effect in the retina of the examiner's eye such that the streak of light appears to (a) move in one direction parallel to its length, (b) move in the opposite direcion parallel to its length, or (c) disappear and reappear without moving to either side, depending upon whether the eye being examined is hypermetropic, myopic or emmetropic, respectively.

In addition, the apparatus described includes further means adapted to produce on the retina of the examiner's eye two reference lines, the deviation of the streak of light from the reference lines indicating an astigmatic condition in the eye under examination.

The invention will now be described with reference to the annexed drawings which illustrate two embodiments of the invention by way of example only:

FIG. 1 of the drawing shows schematically the lay-out of the new system, as seen in a side view:

Figure 1:
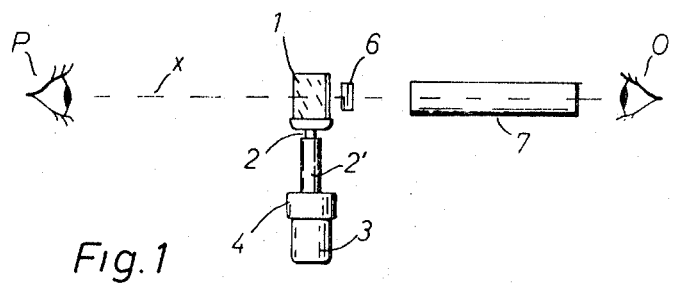
Figure 2:
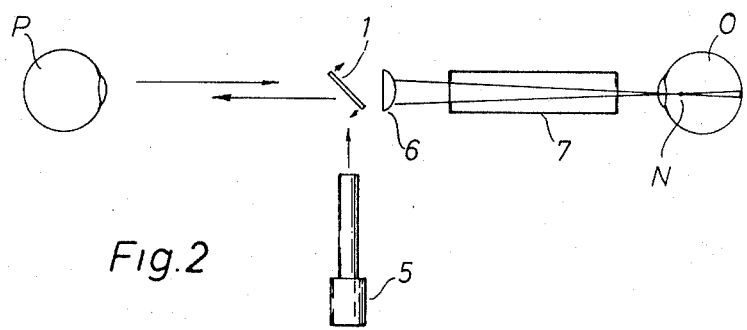
FIG. 2 shows the same system in a top view.

Turning first to FIGS. 1 and 2, the system there illustrated comprises essentially a mirror 1 which is turnable on a shaft 2 extending from a sleeve 2' affixed to a motor 3. An appropriate gear 4 for reducing the speed of the drive, where required, may be provided. There is further provided a point-source of light 5 with a projecting system which is so positioned that it directs a narrow beam of parallel rays onto the mirror 1. A cylindrical lens 6, the axis and focal line of which are parallel to the axis of rotation of the mirror 1, is placed between the mirror 1 and the point to be taken by the eye O of the examiner during an examination.

The use of the new examining apparatus and the new method of examination will be understood from the following:

The point source of light emits a beam directed onto mirror 1. During a certain part of its rotational movement, the mirror is so directed that the light beam striking the mirror is reflected into the eye P of the subject and therefrom it is refracted through the lens 6 into the eye O of the examiner. The nodal point, which is indicated at N, is located at the focal line of the cylindrical lens. The examiner views the pupil of the subject through an eye piece 7, through the cylinder 6 and through the mirror 1 which is a transparent one.

The whole apparatus of FIGS. 1 and 2 is assembled and built to be turnable about a central, longitudinal axis x, which enables the examiner to turn the apparatus in order to account for astigmatism of an eye under examination.

Figure 3:
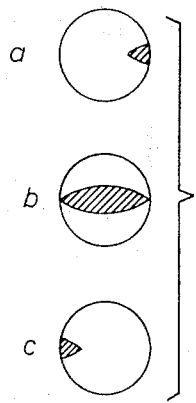
FIG. 3 illustrates schematically the light effects seen in the pupil of an eye under examination in the case of a near-sighted person.
Figure 4:
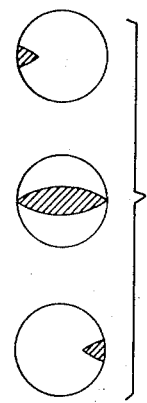
FIG. 4 shows in a similar way the light effects as seen by the examiner in the pupil of a farsighted person.
Figure 5:
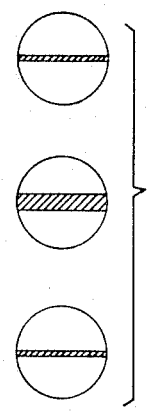
FIG. 5 shows the effects obtained when a normal eye is tested, or illustrates the case where the examiner has made the necessary corrections by placing appropriate lenses in front of the eye.

The light effects observed by the examiner in the eye P of the subject, as the mirror is rotated, are schematically shown in FIGS. 3 to 5.

In the case of a myopic (near-sighted) person the light effect appears at one edge of the pupil in a shape of a spearhead to move across the pupil assuming the shape of an elliptical band, to disappear finally at the opposite edge of the pupil, again in the shape of a peak. At the beginning of the movement the light effect is observed as in a in FIG. 3, the light streak is indicated at b and the disappearing effect is shown as c. In this case the direction of movement of the band of light is from the right to the left and is contrary to the movement of the mirror, (indicated by the arrow M). From this the examiner concludes that the subject is myopic.

In the case of a hypermetropic (farsighted) person the movement is reversed as shown in FIG. 4, i.e. the movement of the band of light is in the direction of rotation of the mirror.

In the case of a normal (emmetropic) person the light effects are different. The light appears all of a sudden across the whole diameter of the pupil and disappears equally suddenly. Closer examination and observation show that the phenomenon comes into existence because a shadow invades and leaves the pupil from above and below simultaneously, and as a result the band is thinned to a very narrow streak when appearing and disappearing.

For a better understanding of what occurs the following should be noted:

The examiner's eye O receives the rays after they have been refracted by the cylinder. As indicated above the examiner's eye is at such a distance from the cylinder that the parallel rays after being refracted cross at the nodal point. In these conditions, the observer's eye will perceive a brilliant linear streak of light which will fill the whole transversal diameter of the subject's pupil. A movement of the mirror will make the light streak disappear suddenly in an undistinguishable direction. If the mirror moves very slowly, the streak will be seen to thin out progressively, shadows invading it from above and below. With a certain rhythm of rotation of the mirror, the streak will seem to rotate on the spot around its own longitudinal axis.

If the subject's eye is not emmetropic, the rays emerging therefrom will not be parallel and the observer will see a more or less elongated, oval or roundish spot, having a "with" or "against" movement.

Figure 6:
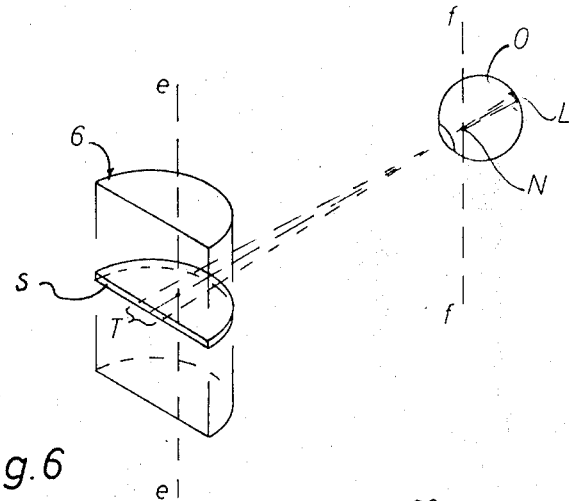
FIG. 6 is an optical diagram helpful to explain the invention.

The diagram of FIG. 6 will further help to explain what actually happens to produce the above-described effects.

As is well known, a cylindrical lens refracts all the parallel rays entering it to a common focal line parallel to the axis of the lens. In FIG. 6, the axis of the lens 6 is represented by line $e$—$e$ and the focal line of the lens is represented by line $f$—$f$. The cylindrical lens 6 is shown orientated so that its convex surface faces the examiner's eye O with the focal line $f$—$f$ of the lens passing through nodal point N of the eye. The pupil of the eye under examination permits only a small bundle of light rays to be returned, this bundle of rays passing through a thin slice of the lens to impinge on the retina of the eye O of the observer. In FIG. 6 the thin slice is diagrammatically represented by slice S on the lens 6, and the small bundle of light rays passing through slice S is diagrammatically represented by the letter T.

If the light rays entering lens 6 at slice S are parallel, the lens would focus the bundle of rays T to cross at the nodal point N of the eye, since that point is on the focal line $f$—$f$ of the lens. As the rays pass further through the eye, they tend to diverge in the direction perpendicular to the focal line $f$—$f$, and thus when they reach the retina, they form a linear streak of light L which is perpendicular to the focal line $f$—$f$.

The above-described movement of the mirror 1 rotates it about an axis parallel to the focal line $f$—$f$ of the cylindrical lens 6, and thereby causes the light rays of bundle T which pass through slice S to shift in a direction perpendicular to the focal line.

Now, if the eye is emmetropic, all the light rays entering slice S of the lens will be parallel and will cross at the nodal point N. Therefore, so long as the mirror is in such position that eye O will receive light rays crossing at the nodal point N, a substantially linear streak L will be produced on the retina, but by the slightest movement of the mirror the rays from slice S will shift away from the nodal point N, and the streak will disappear. Accordingly, the light streak L will disappear and reappear on the retina during this movement of the mirror, thereby producing the effect on the retina illustrated and described with respect to FIG. 5.

On the other hand, if the eye is myopic or hypermetropic, the light rays entering slice S will not cross at nodal point N, but will converge or diverge so that they focus at a point in front of the nodal point (in the case of a myopic condition), or behind the nodal point (in the case of a hypermetropic condition) of the eye. As the mirror is moved, the streak of light L formed on the retina will appear to move in one direction parallel to its length, or in the opposite direction parallel to its length, depending on whether the eye is hypermetropic or myopic. If the eye is myopic, the light rays will focus in front of the nodal point and therefore the streak of light L on the retina will seem to move in the direction opposite to the direction of movement of mirror 1, and will thus produce the effect illustrated and described with respect to FIG. 3. If the eye is hypermetropic, the light rays will focus behind the nodal point, and therefore the streak of light on the retina will appear to move in the same direction as the movement of the mirror, and will thus produce the effect illustrated and described with respect to FIG. 4.

Thus the general principle of the method is not to observe the point of reversal of the eye after having rendered it appropriately myopic but to render the eye emmetropic and to observe the point of reversal of the focal distance of the cylinder.

To this effect plus or minus lenses are used if the ametropia (refractive error) is only a spherical one. If the eye is astigmatic, cylindrical lenses (and sometimes both spherical and cylindrical lenses) are used and the cylinders are rotated until the axis is brought into the right position. When the eye has thus been made exactly emmetropic in all the meridians, the desired phenomenon presents itself. Seen stretching across the subject's pupil is the sharp, brilliant streak of light having no apparent movement to either side but seeming to rotate on the spot. The lenses used measure the refraction.

The advantages of the described method are now apparent. Skiascopy is an accurate method practiced in very inaccurate conditions. The nature and position of the light, the mirror used, the distance between the observer's and subject's eyes, the direction of gaze of the latter, everything is subject to fluctuation.

The necessity of manoeuvring the mirror and changing the correcting lenses at arm's length makes it a tedious procedure. But its most serious handicap is the difficulty of evaluating exactly the point of reversal.

In the described method there is no confused play of light and shadow in the pupil, but the precise movement of a band of light.

At the point of reversal the delicate equilibrium of the light streak can be visibly modified by as little as a 0.12D lens.

The position of the principal meridians may be determined because the streak will loose its "neutral" characteristics when turned away from the emmetropic meridian, or when the axis of the correcting cylinder does so. Only in the principal meridians will the position of the neutral streak or the direction of movement of the light band coincide precisely with the major axis of the pupillary ellipse (appearing so through the cylinder), while in the other ones there will be a more or less oblique displacement of these phenomena.

There is a point source of light whose beam of parallel rays is convenient to scan with the meridians of the eye and which forms the sharpest image on the retina when the eye is rendered emmetropic.

The automatic, regular slow and mono-directional movement of the mirror provides for a regular succession and display of the light phenomena, easy to observe and to interpret.

The cylinder viewing system has, besides its described feature of forming a static streak out of parallel rays, another big advantage, that of reducing the overall distance between the patient and the surgeon. With a cylinder of 8D whose focal line is at 12.5 cm., this distance can be reduced to 25 cm. or less. Small variations in this distance during the examination are unimportant.

The correction of the ametropic eye will best be effectuated with the help of a phoropter connected to the apparatus.

A phoropter, sometimes called a refracting unit or refractor, is an instrument having a plurality of different lenses which may be selectively positioned before a viewing opening. A number of constructions of phoropters are known. The phoropter is positioned in front of the eye being examined, and its different lenses are selectively placed before the examined eye to bring about the emmetropic condition in the eye.

During an examination, the examiner first makes the streak of light rotate around the viewing axis in order to ascertain whether or not there is astigmatism present. In a spherical ametropia, all the examiner has to do is to change correcting lenses until the "neutralized" streak is obtained.

In stigmatism the examiner first looks for the most ametropic meridian by observing the shape, movement, direction and angular orientation of the light band. The apparatus is left in this position, i.e., with the axis of the mirror and cylinder in the emmetropic meridian. Then the axis of the phoropter cylinder is put in the same meridian and the glasses are changed until the static streak is established in the grand axis of the pupillary oval (the ametropic meridian). Small correctional adjustments of the phoropter cylinder's axis are made if necessary. According to a further feature of the invention, an improved means for determining the axis of astigmation is provided, as will be described below.

Figure 7:
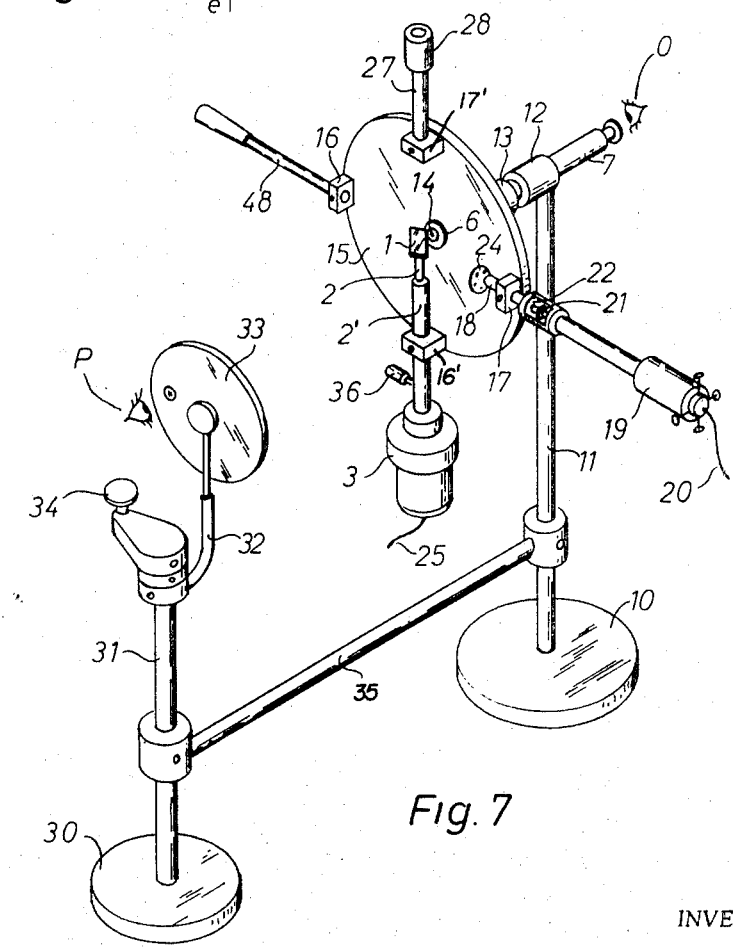
FIG. 7 is a perspective view of a simplified embodiment of an apparatus according to the invention.

A simple embodiment of the new apparatus is shown in FIG. 7.

From a base plate 10 rises a vertical rod 11 which carries at its top a horizontal sleeve 12. Positioned within sleeve 12 and extending from one end thereof is an eye-piece 7. From the opposite end of sleeve 12 projects a tubular member 13 which is in register with the eye-piece 7 and with an aperture 14 in a circular plate or disc 15 affixed to the member 13. The member 13 turns in the sleeve 12. To the plate 15 are affixed, at diametrically opposite points, two brackets 16 and 17. Into bracket 16 enters a handle 48 by means of which the plate 15 with the tubular member 13 can be turned in the sleeve 12. Bracket 17 holds a tube 18 at the end of which is provided a casing 19 containing a lamp to which current is fed by conductor 20. Within tube 18 is provided a projector consisting of a condenser, a small hole and a projecting lens (not seen in FIG. 7; but see FIG. 8). The projecting lens can be properly adjusted by means of a small hand wheel 21 accessible from the outside through an aperture 22 in the wall of tube 18. The wheel, of course, is keyed on a length of pipe which thus forms a hollow shaft. At the other end of tube 18, is provided a diaphragm 24 having a number of differently sized holes. In line with the eye-piece 7, a cylindrical lens 6 is affixed to plate 15 in front of aperture 14.

The mirror 1, in front of lens 6, is fixed to a shaft 2 extending from a sleeve 2' affixed to the motor 3. The shaft 2 is either integral with the motor shaft or with a codirectional extension thereof. Sleeve 2' is supported by a bracket 16' fixed to plate 15, to which plate cylindrical lens 6 is also fixed, as mentioned above. Thus the mirror 1 is always fixedly related to the cylindrical lens 6 upon rotation of plate 15 by handle 48.

Where required, the mirror may be rotated by a manual control of known construction indicated as a whole by manual knob 36. Electrical current is fed to the motor by conductor 25.

From plate 15 extends, also radially, a bar 27 which carries a counterweight 28, bar 27 being fixed to plate 15 by means of bracket 17'.

From a second base plate 30, rises a second vertical rod 31. To the latter is fixed by means of a curved arm 32 a phoropter 33 of known construction. An adjustable chin rest 34 is provided. The two vertical rods 31 and 11 are connected by a cross bar 35.

For an examination the patient rests his or her chin on the chin rest 34 so that the eye to be examined is in line with eye-piece 7; the latter fixing the nodal point of the physician's eye at the focal line of the cylindrical lens 6. The physician looks through the eye-piece and performs the examination according to the above description.

FIGS. 8–12 illustrate another embodiment of the invention. In this embodiment, additional means are provided to enable the apparatus to test for astigmatism. Also in this embodiment, the mirror may be fixed, other means being provided for causing the light beam issuing from the cylindrical lens to sweep the examiner's eye.

Figure 8:
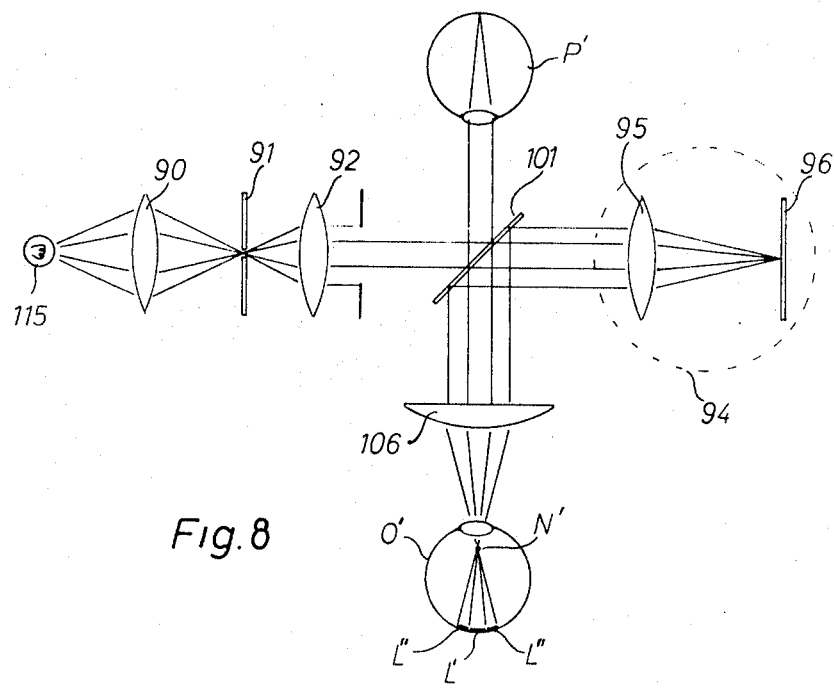
FIG. 8 is a schematic diagram of another embodiment of the invention.

FIG. 8. schematically illustrates the optical system of this embodiment. The eye being examined is identified by the reference numeral P' and the examiner's eye is identified by the reference numeral O'. The light source is identified by the reference numeral 115 and is positioned with respect to the transparent mirror 101 so that the light is reflected into the pupil of the eye P' being examined and then returned through the mirror into the examiner's eye O'. The cylindrical lens 106 is positioned between the mirror 101 and the examiner's eye O', and is adapted, as in the previously described embodiment, to form out of rays returning from the eye P' an astigmatic beam forming on the retina of the examiner's eye O' a linear streak of light perpendicular to the focal line, and also to the axis, of the cylindrical lens 106. As also in the earlier described embodiment, the examiner's eye O' is located so that its nodal point N' is on the focal line of the cylindrical lens.

As so far described, the system is substantially the same as in the FIGS. 1–7 embodiments, and the results produced are the same as above-described. FIG. 8 illustrates some of the other elements that would normally be included in such an optical system between light source 115 and mirror 101, namely a condenser lens 90, an apertured diaphragm 91, and a projecting lens 92, for producing the beam of light rays on transparent mirror 101.

The embodiment schematically illustrated in FIG. 8 includes an additional optical system to enable the apparatus to test for astigmatism. This new optical system, as enclosed within the dotted circle 94 in FIG. 8, may be termed an "auxiliary eye." It is housed in handle 48 in the FIG. 7 embodiment, so that it is in line with the light source, but on the opposite side of the mirror.

The new "auxiliary eye" 94 includes a lens 95 and a reflecting screen 96, arranged so that light from source 115 passes through mirror 101 and is focused by lens 95 to a spot on screen 96, whereupon it is returned through lens 95 to mirror 101, and is then reflected into cylindrical lens 106. The cylindrical lens acts on the light rays returned from screen 96 in the same manner as light rays returning from the eye P', namely it forms an astigmatic beam which produces a linear streak of light on the examiner's eye. However, the arrangement is such that the linear streak of light produced from the rays reflected from screen 96 is of greater length than that produced from the rays emerging from the eye P', so that the streak from screen 96 coincides with that of eye P¹ but extends further to each side of the streak of eye P'. This is indicated by the light streaks formed on the retina of the examiner's eye O' as illustrated in FIG. 8, wherein light streak L' represents the streak caused by the rays returning from the patient's eye, and the streaks L" represent the streaks caused by the rays emerging from the "auxiliary eye," i.e. screen 96 and lens 95.

Streaks L" produced by the rays originating from screen 96 will always assume a correct position because the "auxiliary eye" has no astigmatic aberration, and therefore they serve as reference lines for the eye being examined. If light streak L' deviates from those of L", this will indicate an astigmatic condition in the eye being examined.

In testing for astigmatism, therefore, the examiner need observe whether the streak L' produced from the rays returning from the patient's eye P' is in line with the streaks L" produced by the rays reflected from screen 96. To test for different meridians, cylindrical lens 106 is rotated. The positions where the streaks L' and L" coincide indicate the principal meridians.

The embodiment of FIG. 8 could also incorporate means for rotating the mirror 101, or means permitting the mirror to be rotated, about an axis parallel to the focal line of the cylindrical lens in order to sweep the pupil of the eye O', to produce the effects described above with respect to the earlier embodiment. However, instead of rotating the mirror, a rotating apertured disc may be used to sweep the beam across the observer's eye O'. This is diagramatically illustrated in FIG. 9, the cylindrical lens being identified as 206 and the observer's eye as O'. The apertured disc is identified as 220. The disc is rotatable about its axis 221, and an aperture 222 is eccentrically formed on the disc between the cylindrical lens 206 and the examiner's eye O'. As the disc rotates, the light from cylinder 206 is caused to sweep across the pupil of the examiner's eye O' and this will produce the same effects as described above with respect to the use of the rotating mirror.

One phenomenon has to be referred to with respect to the use of a rotating disc. When a rotating mirror was used, the observer's eye has to be located so that its nodal point was positioned at the focal line of the cylindrical lens, as described above. However, when the rotating disc 220 is used to sweep the beam, the aperture 222 of the disc has to be located at the focal line of the cylindrical lens. The disc and the observer's eye contain the two nodal points of the new compound homocentric optical system thus formed.

Figure 9:
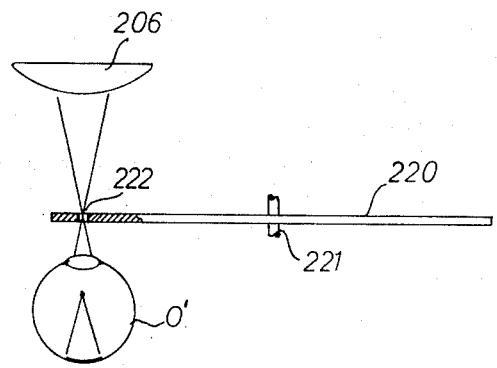
FIG. 9 illustrates a variation in a part of the system of FIG. 8.
Figure 10:
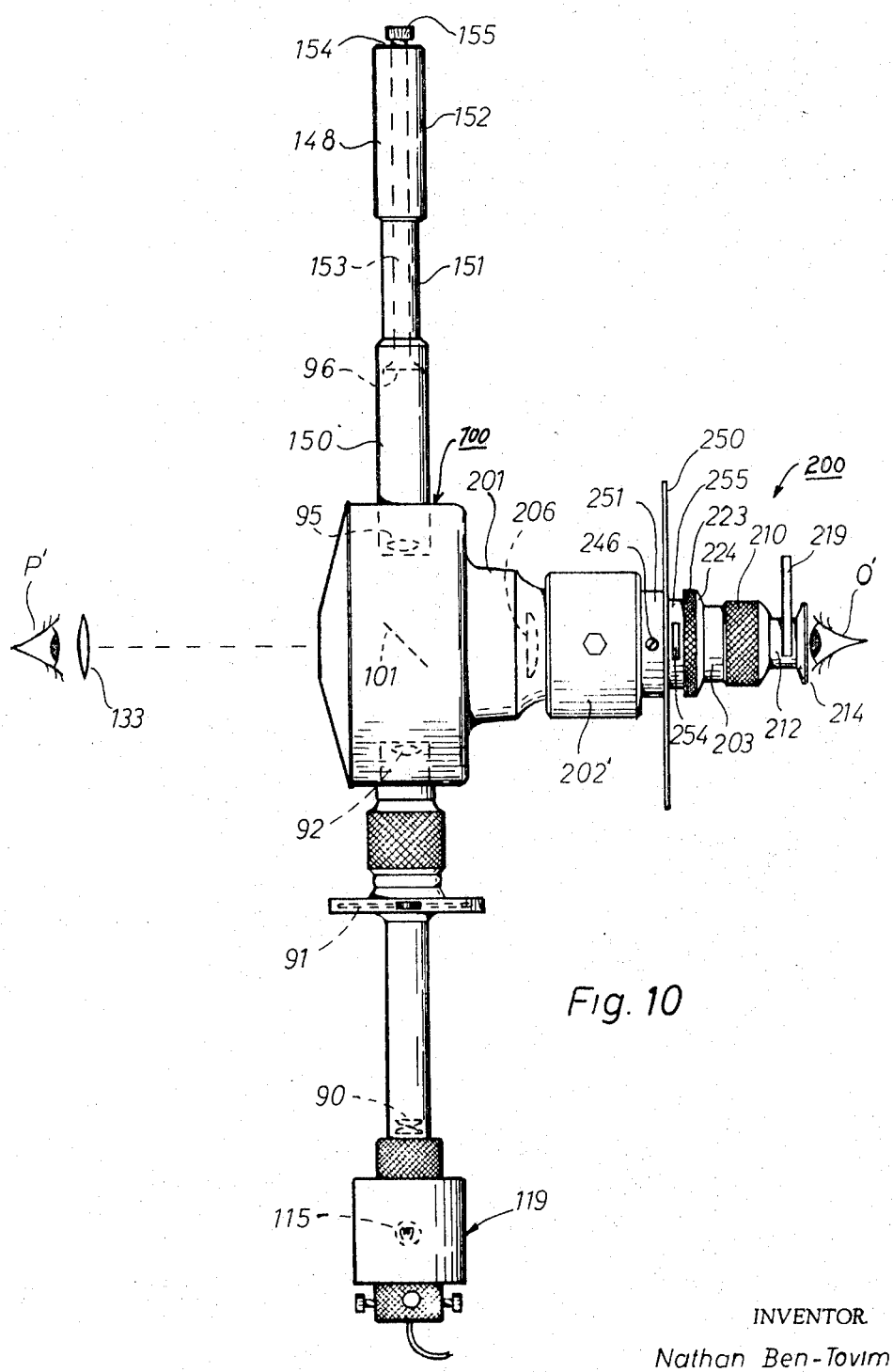
FIG. 10 illustrates a practical design of an apparatus according to the embodiment of FIGS. 8 and 9.

FIG. 10 illustrates a practical design similar to that of FIG. 7 but incorporating the features of both FIGS. 8 and 9.

In FIG. 10, a housing 100 is provided in which is disposed the transparent mirror 101. The mirror 101 is inclined at an angle of 45° with respect to the viewing line.

To one side of the mirror is disposed the housing 119 for the source of light from which starts a beam of light rays towards the mirror. The main elements forming the light beam (as also shown in the diagram of FIG. 8) are the light bulb 115, the condenser lens 90, the apertured diaphragm 91, and the projecting lens 92. Apertured diaphragm 91 controls the size of the beam of light.

The eye P' to be examined is positioned in line with the mirror 101 and at a right angle to the light source housing so that it will receive the light rays reflected by the mirror. A phoropter 133, for selectively changing lenses in front of the eye being examined, is positioned just in front of the location to be assumed by eye P'.

The optical system so far described is basically the same as in the FIG. 7 embodiment. The variations in the present embodiment are incorporated in the parts of the optical system assumed by handle 48 and eye-piece 7, etc. of the FIG. 7 embodiment.

Tube 148, which occupies the position corresponding to that of handle 48 in the FIG. 7 design, houses the "auxiliary eye" 94, comprising the lens 95 and the screen 96. The tube 148 is shown as constructed in three parts. The inner part 150 is fastened to housing 100 and supports the lens 95 at the inner end thereof in line with the mirror 101. An intermediate part 151 connects the inner part 150 with an outer part 152, the latter supporting a rod 153 carrying the screen 96. Outer part 152 is closed at its upper end 154, the latter end being formed with a threaded opening receiving the rod 153. The outer end of rod 153 is also threaded and carries a knurled knob 155. The position of screen 96 may be varied by turning knob 155.

Screen 96 may be made of almost any reflecting material, white paper having been found to be very suitable. It should be positioned at the focal distance of lens 95 so that the light rays passing through the lens are focussed to a point on the screen and are then returned back through the lens as a bundle of parallel rays to mirror 101, which in turn reflects the light into the cylindrical lens, all as described above with reference to FIG. 8.

The fourth position of the optical system, containing the cylindrical lens 206 and the eyepiece for the examiner's eye O', is occupied by a substantially different assembly of elements from the design of FIG. 7. This assembly is generally designated as 200, and is more particularly illustrated in FIGS. 11 and 12.

It incudes a substantially cylindrical housing 201 attached to housing 100 and supported on a vertical post 202 by a collar 202' encompassing housing 201. Fitted in housing 201 is a sleeve 205 carrying the eye-piece assembly for the examiner's eye O'. In sleeve 205 is rotatably mounted another sleeve 203 by a pair of ball-bearing assemblies 204 disposed at each end of sleeve 205. The inner end of sleeve 203 carries a mounting ring 207 for a cylindrical lens 206 (the same as lenses 6 and 106 described earlier), the lens being secured to the mounting ring by a retaining ring 208. The opposite end of sleeve 203 supports a knurled ring 210 to enable sleeve 203 to be rotated, in order to rotate cylindrical lens 206.

Fitted within sleeve 203 is another sleeve 212 which carries the above-referred-to rotatable disc 220, this disc being housed in housing 219 carried at one end of sleeve 212. The latter sleeve terminates in an eye-piece 214 having a viewing opening 215 through which the examiner's eye views the cylindrical lens 206.

Disc 220, which is contained in housing 219, is supported at its center by a pin 221 about which it is adapted to be rotated. The outer periphery of disc 220 is formed with a plurality of small apertures 222. The arrangement is such that as the disc is slowly rotated, each of the apertures 222 is successively brought into alignment with, and then across, the viewing opening 215 in the eye-piece 214. During this disc rotation, each of apertures 222 is moved in a direction perpendicular to the axis of cylindrical lens 206, to cause the light emerging from the lens to sweep the observer's eye in the same manner as effected by the rotation of the mirror in the earlier-described embodiment. Thus, rotation of disc 220 will produce the same effects in the observer's eye as described above with reference to FIGS. 3–6.

The means provided for rotating the disc incude a knurled ring 223 rotatably supported on an annular ring 224 fixed to sleeve 203. As shown particularly in FIG. 11, annular ring 224 carries a pin 225 on which is rotatably mounted a friction wheel 226 engageable with the inner surface of knurled ring 223, so that wheel 226 is rotated with the knurled ring. Friction wheel 226 engages another friction wheel 228 carried at one end of a shaft 230, the other end of which carries another wheel 232 engaging the disc 220. Shaft 230 is journalled through a pair of mounting discs 234 and 236 carried on the inside of sleeve 212. The two mounting discs 234 and 236 have aligned apertures through the centers thereof in alignment with the viewing opening 215 in eye-piece 214.

To rotate disc 220, knurled ring 223 is manually rotated, which transmits the rotational movement to disc 220 through wheels 226 and 228, shaft 230, and wheel 232.

Means are provided for indicating the position of cylindrical lens 206, and thereby the meridian being examined. This means comprises a scale 250 fixed to housing 201 by a ring 251 carried by a bracket 252, and a pointer arm 253 having a screen 254, the arm being attached to sleeve 203 by a ring 255. Scale 250 is graduated and marked in degrees from 0–180. Pointer 253 carries a light bulb 256 by means of another bracket 258 passing under the scale 250. The scale 250 is transparent, so that the light from bulb 256 will pass through it and will display the angular position of the pointer 253, and thereby of the cylindrical lens 206, by projecting the markings of the scale 250 onto the screen 254.

A variable pressure means is provided to retain sleeve, 203 an cylindrical lens 206 in position, this means comprising a cylindrical insert 240 passing through ring 251 and sleeve 205, the insert carrying a pressure element 242, such as rubber, in light contact against sleeve 203. Element 242 is spring-biased by spring 244, the pressure thereof being variable by screw 246. The arrangement is such that sleeve 203 is held in place unless intentionally moved by turning ring 210.

Figure 11:
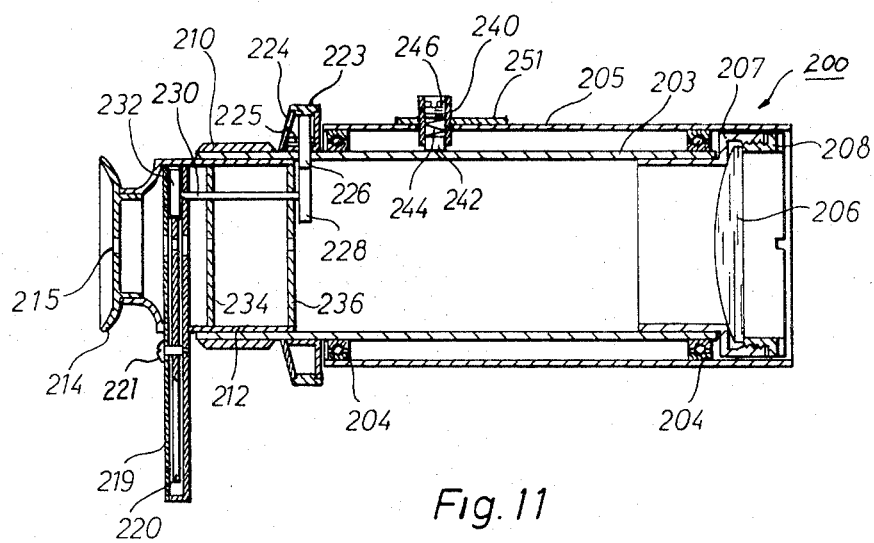
FIG. 11 is a sectional view through a portion of the apparatus of FIG. 10, with certain parts removed.
Figure 12:
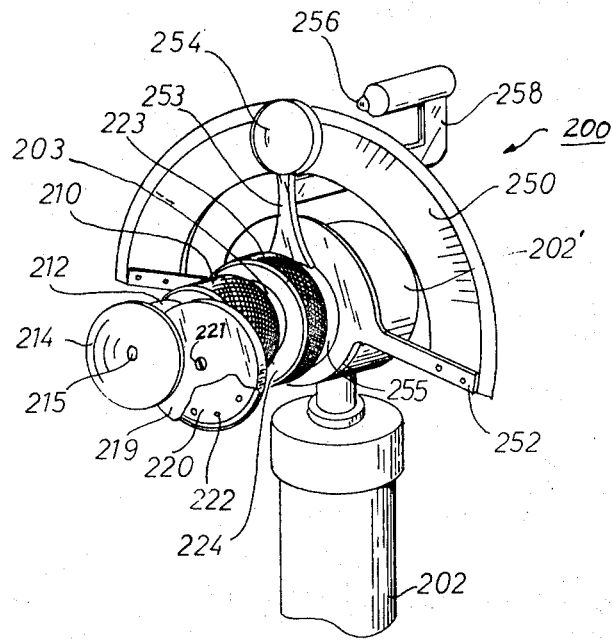
FIG. 12 is a perspective view of that portion of the apparatus of FIG. 10 illustrated in FIG. 11.

In the embodiment of FIGS. 10–12, sweeping of the pupil of the observer's eye O' in order to produce the effects described with reference to FIGS. 3–6 can be produced by rotating ring 223, which causes the apertures 222 of disc 220 successively to sweep past the viewing opening 215 in the eye-piece 214. Thus, this arrangement obviates the necessity of rotating mirror 101 to produce this effect included in the earlier-described embodiment, and mirror 101 therefore may be permanently fixed in the position illustrated.

The arrangement of FIGS. 10–12 also simplifies the means for examining the different meridians of the eye, which in the earlier embodiment was affected by rotating the assembly including the mirror and the cylindrical lens. In the FIGS. 10–12 embodiment, the same result is accomplished by merely rotating ring 210, which rotates the cylindrical lens 206 and at the same time rotates housing 219 as well as the apertured disc 220 carried within the housing so that the apertures always move in a direction perpendicular to the focal line and axis of the cylindrical lens.

The arrangement of FIGS. 10–12 provides the still further advantage of enabling the apparatus to test for astigmatism in any of the meridians, as described above.

I claim:

1. Apparatus for objective ocular refractometry, comprising: a point-source of light; a transparent mirror for reflecting the light into the examined eye and transmitting the light emerging therefrom; a cylindrical lens located behind the mirror in such a position that the mirror is interposed between the cylindrical lens and the examined eye, said cylindrical lens serving to collect the rays emerging from the examined eye and transmitted through the mirror, to form them into an astigmatic beam, and to focalize parallel rays into a sharp linear streak of light upon the retina of the examiner's eye; sweeping means for sweeping the rays emerging from said cylindrical lens across the retina of the examiner's eye, along the different meridians; and optical means for correcting the ametropia of the examined eye.

2. Apparatus as defined in claim 1, wherein said sweeping means includes means permitting said mirror to be rotated about an axis parallel to the focal line of said cylindrical lens.

3. Apparatus as defined in claim 1, wherein said sweeping means includes a disc having at least one aperture located between the cylindrical lens and the examiner's eye, said disc being rotatably mounted to move its aperture in a direction perpendicular to the focal line of the cylindrical lens.

4. Apparatus as defined in claim 1, further including means effective to rotate said streak of light on the retina of the examiner's eye around an axis passing perpendicularly through the middle of the streak's length, in order to examine different meridians of said eye being examined.

5. Apparatus as defined in claim 4, wherein said means effective to rotate said streak of light includes a rotatable mounting for said mirror and said cylindrical lens.

6. Apparatus as defined in claim 4, wherein said means effective to rotate said streak of light includes a rotatable mounting for said cylindrical lens, said mirror being non-rotatable.

7. Apparatus as defined in claim 1, further including means for producing on the retina of the examiner's eye two reference lines, the deviation of said streak of light from said reference lines indicating an astigmatic condition in the eye under examination.

8. Apparatus as defined in claim 7, wherein said last-mentioned means includes a lens and a light-reflecting screen adapted to receive light from said light source through said tansparent mirror, the light being reflected from said screen to said mirror and being in turn reflected into said cylindrical lens, the light thenceforth passing into the examiner's eye to produce said reference line.

References Cited

UNITED STATES PATENTS

| | | | |
|---|---|---|---|
| 1,921,318 | 8/1933 | Morrison | 351—13 |
| 3,136,839 | 6/1964 | Safir | 88—1 |
| 2,049,222 | 7/1936 | Reason | 351—13 X |
| 2,777,364 | 1/1957 | Murray | 351—14 X |

DAVID SCHONBERG, Primary Examiner

PAUL A. SACHER, Assistant Examiner

U.S. Cl. X.R.

351—1